Oct. 14, 1958  R. M. WATSON  2,856,209
PACKING FOR ROTARY ELEMENT OR SHAFT
Filed Dec. 8, 1954  2 Sheets-Sheet 1

RALPH M. WATSON
*INVENTOR.*

BY *Daniel A. Bobis*
*atty*

RALPH M. WATSON
INVENTOR.

United States Patent Office 2,856,209
Patented Oct. 14, 1958

2,856,209

PACKING FOR ROTARY ELEMENT OR SHAFT

Ralph M. Watson, Bloomfield, N. J., assignor to Worthington Corporation, Harrison, N. J., a corporation of Delaware Application December 8, 1954, Serial No. 473,801

9 Claims. (Cl. 286—8)

This invention relates to packing for rotary elements such as the impeller shafts of high pressure pumps and the like where the packing is subject to high differential fluid pressure loading, and more particularly to a packing assembly made up of packing units each having means thereon which limits the loading of any one packing unit to a predetermined differential fluid pressure thereacross and thereby acts to distribute by independent and additive effect the total differential fluid pressure across the packing assembly without excessively loading any individual packing unit in the assembly.

In conventional packing means for rotary shafts subject to high pressure, when the differential pressure loading across the packing becomes excessive; sealing off, overheating and other difficulties develop which damage the packing, the shaft or the shaft seal, causing objectionable leakage which requires maintenance or replacement of parts to correct the difficulty.

The present invention seeks to overcome this difficulty by providing a packing assembly on a rotary shaft comprising a plurality of packing units disposed side by side with a pre-set relief means in each unit such that each unit cannot be subjected to an excessive differential fluid pressure loading.

Accordingly, it is an object of the present invention to provide a packing assembly for a rotary element adapted to receive high differential fluid pressure loading thereacross.

It is another object of the present invention to provide a packing assembly having a plurality of packing units therein, each pre-set to restrict and limit the differential fluid pressure loading exerted across the unit.

With these and other objects in view, as may appear from the accompanying specification, the invention consists of various features of construction and combination of parts, which will be first described in connection with the accompanying drawings, showing a packing for rotary element or shaft of a preferred form embodying the invention, and the features forming the invention will be specifically pointed out in the claims.

Figure 1:
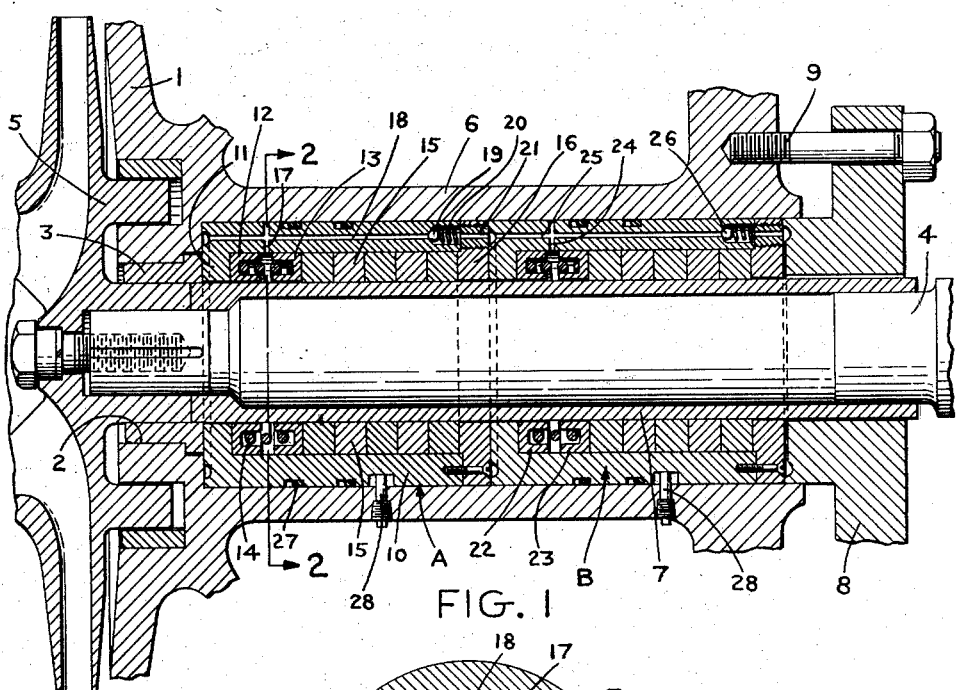
Figure 1 is a longitudinal section through one form of the improved packing.

Referring to the drawing, for the purpose of illustration the present invention is shown in Figure 1 as applied to a shaft or rotary element 4 mounted in a bearing 3 in the opening 2 of a centrifugal pump housing 1. The shaft 4 mounts the impeller 5 of the pump and extends through a stuffing box 6 formed in the pump housing 1 about the opening 2. The opening 2 and bearing 3 communicates with the discharge fluid under high pressure also clearly shown in Figure 1 of the drawings.

As is well known by those skilled in the art, in this type construction, leakage of fluid at discharge pressure will occur across the shaft 4 at the point where it extends through the opening 2 into the stuffing box 6. Hence, packing means will be mounted in said stuffing box about the portion of the shaft extending therethrough to reduce the leakage fluid to a point consonant with proper operation of the unit in which the shaft is connected.

A differential fluid pressure loading will thus exist between the inner end and the outer end of the packing structure and the present invention comprises means for sealing against excessive fluid leakage due to this differential pressure and for distributing this sealing effect in such manner that no packing rings are compressed excessively, i. e., sufficiently to overheat and score the shaft.

Thus Figure 1 shows a shaft sleeve 7 mounted about that portion of the shaft extending through the stuffing box 6 whereby a packing assembly comprising packing units A and B may be mounted about the sleeve in the stuffing box 6. A gland 8 or the like will act to hold the packing assembly in the stuffing box, the gland 8 being threadably connected as at 9 to the outer end of the stuffing box.

While only two units A and B are shown for the present packing assembly, as will appear more clearly hereinafter, the number of such units may be varied depending on the total differential fluid pressure across the packing assembly, the only limit being set on the differential fluid pressure loading across any particular packing unit as hereinafter described.

*Packing unit*

The packing units A and B, mounted in the stuffing box 6 about the shaft sleeve 7, are identical to each other as is clearly shown in Figure 1 of the drawings. However, the units may be varied for varying conditions; i. e., the temperature; the physical or chemical characteristics of the fluid packed against; the conditions of service or use; speed of operation; shaft sleeve material; packing material or materials; and this is believed to be more clearly illustrated by the form of the invention shown in Figure 3 of the drawings.

Thus, each packing unit includes a packing sleeve 10 one end of which is provided with a flange 11 which extends inwardly towards the outer surface of the sleeve 7, providing a space within the sleeve 10 in which is mounted, at the end adjacent the internal flange 11, a pair of channel rings 12 and 13 disposed in opposed relation to each other, that is, with the open sides of their channels facing. These rings 12 and 13 are urged apart by a spring 14 so that the channel ring 12 will be urged tightly into engagement with the inner side of the internal flange 11 while the outer side of the channel ring 13 will be urged into firm contact with a plurality of packing rings 15 of any suitable packing material, urging this series of packing rings 15 into engagement with the disc 16 which is attached to and forms a closure for the end of the packing sleeve 10 remote from the internal flange 11. The packing sleeve has one or more radial openings 17 therein the inlet ends of which open into the space between the two channel rings 12 and 13. The radial opening or passage 17 also opens into one or more cooperating circumferentially disposed longitudinal passages 18 in the packing sleeve 10 so that leakage fluid will pass through the radial opening 17 into the longitudinal opening 18 and pass therealong. Spring pressed check valves 19 are provided at the outlet of each longitudinal passage 18 and springs 20 urge the check valves 19 into normally closed position. The check valves 19 also act as relief valves in that they may be pre-set to hold the valve seated against a predetermined fluid pressure by adjusting elements 21 for each valve 19, which elements are threadably mounted in the closure disc 16 for the particular packing unit.

In operation, the differential fluid pressure acting across any particular unit will depend on the setting of the check valves 19 as the pressure of the leakage fluid acting through the radial openings 17 and longitudinal passages 18 will not unseat the valve 19 until the pressure thereof exceeds the predetermined setting of the valve.

When the differential fluid pressure acting across any particular packing unit, as for example, packing unit A shown in Figure 1, exceeds this predetermined limit or setting, the check valve opens to allow this excessive differential fluid pressure to be exerted against the next adjacent packing unit and thereby prevents the packing unit A from being overloaded.

The next adjacent packing unit in the present illustration shown as unit B, having the same construction, will operate in a similar fashion to prevent the differential fluid pressure across unit B from exceeding the predetermined set value, and thus leakage fluid will pass through the opening in the channel rings 22 and 23, the radial passages 24 and longitudinal passage 25 to the check valve 26 at the outlet end of the longitudinal passages 25, which valve, similarly to valve 19 above described, is preset to open at a predetermined fluid pressure, will serve identically the same function as that above described for valves 19 on unit A.

The number of units desired will depend on the total overall differential fluid pressure loading which will act across the packing assembly. For example, where the differential fluid pressure will be approximately 900 p. s. i. g., three units, each unit pre-set to 400 p. s. i. differential pressure might be utilized thereby insuring that no particular packing unit in this assembly would carry an undue or excessive differential fluid pressure load. The value 400 p. s. i. differential fluid pressure is purely illustrative, as there might be two units at 600 p. s. i. differential fluid pressure, or three units at 600, 400 and 200 p. s. i. differential pressure etc., as is empirically determined for the particular service or use.

If it is desired, O-rings may be provided at suitably spaced points about the outer surface of the packing sleeve 10 for engagement with the inner wall of the stuffing box 6 to form a seal between these elements. Also, stop pins 28 are provided to hold the packing units from rotation.

Figure 3:
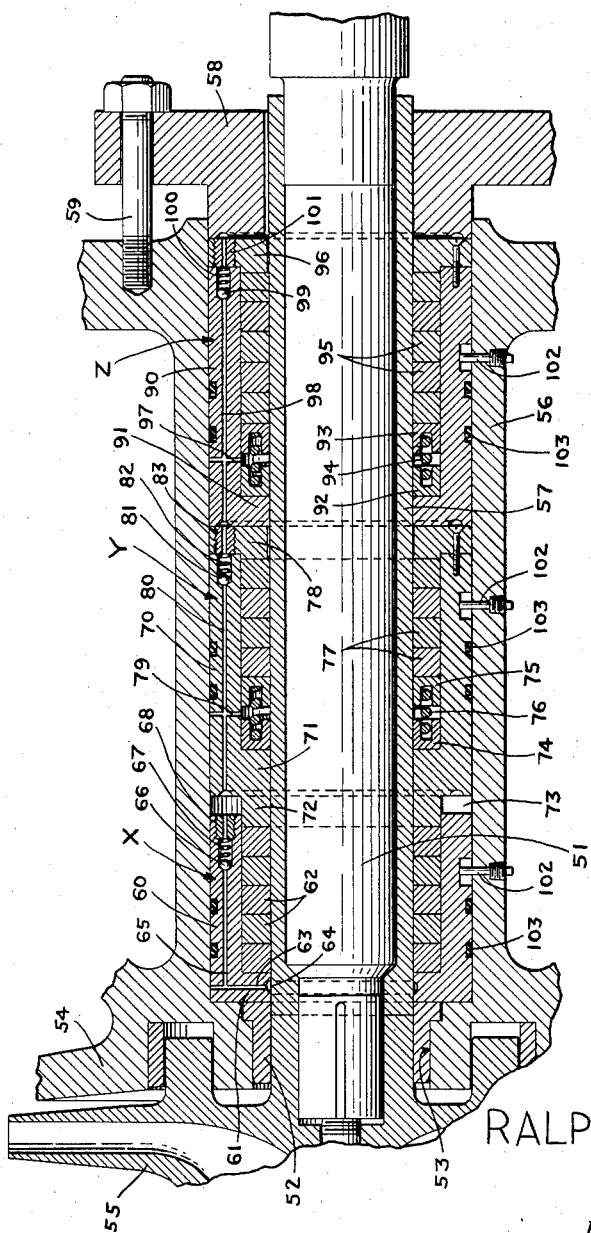
Figure 3 is a longitudinal section through another form of the improved packing.

The form of the invention shown in Figure 3 of the drawings illustrates the construction which can be modified to meet varying conditions of service and other variables above mentioned such as temperature, physical characteristics of the fluid packed against; the type packing utilized, etc.

Thus in Figure 3 of the drawings the invention is shown once again as applied to the shaft or rotary element 51 mounted in a bearing 52 in the opening 53 of a centrifugal pump housing 54. The shaft 51 mounts the impeller 55 of the pump and extends outwardly thereof through a stuffing box 56 formed on the pump housing 1 about the opening 53. The opening 53 and bearing 52 communicate with the discharge fluid from the pressure and accordingly, as in the case of the form of the invention shown in Figure 1, a differential fluid pressure loading will exist between the inner end and the outer end of the packing assembly hereinafter described which constitutes the means for sealing against excessive fluid leakage due to this differential pressure.

Figure 3 further shows a shaft sleeve 57 mounted about that portion of the shaft 51 extending through the stuffing box 56 whereby the packing assembly comprising three units X, Y and Z, may be mounted about the outer surface of the sleeve in the stuffing box 56. A gland 58 threadably connected as at 59 to the stuffing box 56 will act to compress the packing assembly in the stuffing box 56 when the threaded elements 59 are tightened inwardly, the inner end of the unit X abutting the outer face of the pump housing 54 about the opening 53 as is clearly shown in Figure 3 of the drawings.

In this form of the invention though three units are shown, it will be understood that the number of units may be varied in accordance with the conditions of service.

Two of the units X and Y are shown to have a coacting relationship as is also more fully described hereinafter, while unit Z is similar in construction and operation to the units A and B above described for the form of the invention shown in Figure 1 of the drawings.

Thus, packing unit X includes a packing sleeve 60, one end of which is provided with a flange or shoulder 61 which extends inwardly towards the outer surface of the shaft sleeve 57 providing a space within the sleeve 60 to receive a plurality of packing rings 62 which may be made of any suitable material for the particular conditions of service. The packing sleeve has one or more radial passages 63 in the inner extending flange or shoulder 61 thereof. The radial passages 63 communicate with an annular groove 64 in the abutting face of the flange or annular shoulder 61 adjacent the shaft sleeve 57. The radial passages 63 also communicate with one or more cooperating circumferentially disposed longitudinal passages 65 disposed in the packing sleeve 60 substantially parallel to the axial line of the shaft 51 so that leakage fluid will pass through the annular groove 64 and radial passages 63 into the longitudinal passages 65 and pass therealong. Spring pressed check valves 66 are provided at the outlet of each longitudinal passage 65 at the end remote from the point of communication with said radial passages 63 and springs 67 urge these check valves 66 into a normally closed position. The check valves 66 also act as relief valves in that they may be pre-set to hold the valves 66 seated against a predetermined fluid pressure by adjusting elements 68 for each valve which elements in this type unit are threadably disposed in the outer peripheral end of the packing sleeve 60.

The annular packing receiving space formed in the packing sleeve by the flange or shoulder 61 is opened at the end thereof remote from said shoulder as is indicated in Figure 3 of the drawings. The packing unit Y acts to compress the packing elements 62 in this annular packing receiving space and as a closure for this outer end of the space.

Thus unit Y includes a packing sleeve 70 with a flange 71 extending inwardly to abut the surface of the shaft sleeve 57 and on the inner end of the packing sleeve adjacent or integral with the flange 71 an annular element or lateral projection 72 is so positioned that when the packing sleeve 70 is urged inwardly by axial movement of the gland 58 the annular shoulder will engage and act to compress the packing elements 62 and close the outer end of the annular packing receiving space formed in the packing sleeve 60. A clearance space 73 allows for the desired axial inward movement of the unit Y with respect to unit X. The flange or annular shoulder 71 forms a space within the packing sleeve 70 in which is mounted at the end adjacent this flange 71 a pair of channel rings 74 and 75 disposed in opposing relation to each other, i. e., with the open sides of their channels facing. These channel rings 74 and 75 are urged apart by a spring 76 so that the channel ring 75 will be urged tightly into engagement with the inner side of the flange element 71 while the outer side of the channel ring 75 will be urged into firm contact with a plurality of packing rings 77 of any suitable packing material for the conditions of service, thereby urging this series of packing rings 77 into engagement with a disc element 78 attached to and forming a closure for the annular packing receiving space for the packing sleeve 70 remote from the flange or annular shoulder 71. The packing sleeve 70 has one or more radial openings 79 the inlet ends of which open into the space formed between the two channel rings 74 and 75. The radial passages 78 also communicate with one or more cooperating circumferentially disposed longitudinal passages 80 in the packing sleeve 70 in a plane substantially parallel to the axial line of the shaft 51 so that leakage fluid will pass through the radial passages 79 into the longitudinal passages 80 and pass therealong. Spring pressed check valves 81 are similarly provided in this unit as in the prior units described at the outlet end of each of said longitudinal passages 80 and springs 82 urge the check valves 81 into a normally closed position. The check valves 81 also act as relief valves in that they may be pre-set to hold the valves seated against a predetermined fluid pressure by adjusting elements 83 for each of said valves 81 which elements are threadably mounted in the closure discs 16 for the particular packing unit Y.

Figure 2:
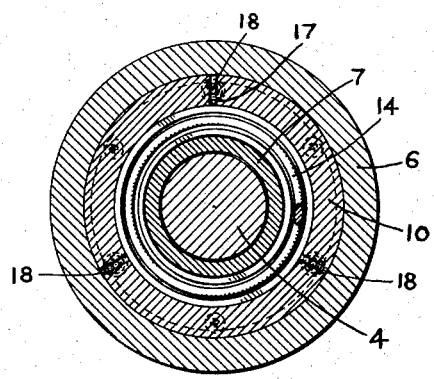
Figure 2 is a cross section taken on the line 2—2 of Figure 1.

In the form of the invention shown in Figure 3 unit Z is identical with the construction and operation as above described for units A and B in the form of the invention shown in Figures 1 and 2. Accordingly, unit Z includes a packing sleeve 90 one end of which is provided with a flange 91 which extends inwardly towards the outer surface of the shaft sleeve 57 to abut the same. The flange 91 provides a space within the sleeve 90 in which is mounted at the end adjacent the flange 91 the usual pair of channel rings 92 and 93 disposed in opposed relation to each other and a spring 94 urging the element 92 into engagement with the inner side of the flange 91 and the element 93 into engagement with a plurality of packing rings 95 to compress the packing rings 95 into engagement with the disc 96 which is attached to and forms the closure for the end of the packing sleeve 90 at the end of the packing receiving space remote from the internal flange 91. The packing sleeve 90 of unit Z similarly has one or more radial openings or passages 97 the inlet ends of which open into the space between the channel rings 92 and 93. The radial passages 97 also communicate with one or more circumferentially disposed longitudinal passages 98 in the packing sleeve 90 in a plane parallel or substantially parallel to the axial line of the shaft 51. Thus leakage fluid will pass through the radial opening 97 into the longitudinal passage 98 and pass therealong. Spring pressed check valves 99 are provided at the outlet end of each of the longitudinal passages 98 and springs 100 urge the check valves 99 into a normally closed position. The check valves similarly also act as relief valves in that they may be pre-set to hold the valve seated against a predetermined fluid pressure by adjusting elements 101 for each of said valves 99 which elements are threadably mounted in the closure disc 96 for the particular packing unit Z.

Operation

In operation, the units are set in position as shown in Figure 3 of the drawings so that units X and Y will coact as above described on inward movement of the gland 58 when the threaded element 59 is tightened.

The differential fluid pressure acting across any particular unit will depend on the setting of the check valves 66, 81 and 99 as the pressure of the leakage fluid acting through the radial openings 63, 79 and 97 respectively of these units and their communicating longitudinal passages 65, 80 and 98 will not unseat the valves 66, 81 and 99 until the pressure thereof exceeds the predetermined pressure setting of the valve.

When the differential fluid pressure acting across any particular packing unit, as for example, packing unit X, shown in Figure 3, exceeds this predetermined limit or setting, the check valve 66 opens to allow this excessive differential fluid pressure to be exerted against the next adjacent packing unit and thereby prevents the packing unit X from being overloaded.

Similarly, the next adjacent packing unit Y, or the packing unit Z, having the same or similar construction will operate in the same fashion to prevent the differential pressure across units Y and Z respectively from exceeding their predetermined settings.

In order to prevent the units from rotating in the stuffing box 56 stop pins 102 are provided for each of the packing units to hold the same from rotation. If it is desired, each of the packing units may also be provided with O-rings 103 at suitably spaced points about the outer surface thereof for engagement with the inner wall of the stuffing box to form a seal between these elements.

It will be understood that the number of units utilized will depend on the total overall differential fluid pressure loading which will act across the entire packing assembly. In addition, the units may be modified as to position as well as number without departing from the spirit of the present invention.

It will be understood that the invention is not to be limited to the specific construction or arrangement of parts shown, but that they may be widely modified within the invention defined by the claims.

What is claimed is:

1. Packing units for a packing assembly subject to high pressure leakage fluid adapted to bypass said fluid when the differential pressure across the unit exceeds the predetermined setting for the particular unit comprising an independent enclosing casing for each of said units recessed to form an annular packing receiving space and having an annular shoulder at the pressure end of said packing receiving space, compressible packing rings in said annular packing receiving space, means at the end remote from the pressure end for maintaining said compressible rings in said packing receiving space, means disposed in said annular recess for compressing said compressible packing rings, bypass passage means extending through said casing parallel to the axial line of said shaft, inlet means for said passage means to receive leakage fluid under pressure, regulating means in said passage, means regulating the pressure at which said regulating means will open, and said passage means having its outlet end disposed to pass the leakage fluid at the pressure setting of said regulating means to the next adjacent packing unit.

2. Packing units for a packing assembly subject to high pressure leakage fluid adapted to bypass said fluid when the differential pressure across the unit exceeds the predetermined setting for the particular unit comprising an independent enclosing casing for each of said units recessed to form an annular packing receiving space and having an annular shoulder at the pressure end of said packing receiving space, compressible packing rings in said annular packing receiving space, means at the end remote from the pressure end for maintaining said compressible rings in said packing receiving space, resilient means in said annular packing receiving space adjacent the shoulder end of said casing to coact with said shoulder for compressing said compressible packing rings, bypass passage means extending through said casing parallel to the axial line of said shaft, inlet means for said passage means to receive leakage fluid under pressure, regulating means in said passage, means regulating the pressure at which said regulating means will open, and said passage means having its outlet end disposed to pass the leakage fluid at the pressure setting of said regulating means to the next adjacent packing unit.

3. In a packing unit for a packing assembly as claimed in claim 2 wherein said regulating means includes a check valve of the ball type in said bypass passage means and a resilient element in engagement with said ball, and threaded means in said casing in engagement with said resilient element for adjusting said element to the desired predetermined limit for the unit.

4. A packing assembly to be mounted in the stuffing box about a rotary element subject to high pressure leakage fluid including a plurality of packing units mounted in said stuffing box about the rotary element and disposed to coact with each other; each of said units comprising, an enclosing casing recessed to form an annular packing receiving space having an annular shoulder at the pressure end of said annular packing receiving space, compressible packing rings in said annular packing receiving space, at least one of said units having the end of its packing receiving space remote from the annular shoulder opening, and means on the unit adjacent to the open ended packing receiving space to engage and compress the packing in said open ended packing receiving space on axial movement of said adjacent unit relative to said rotary element, an adjustable gland connected to the outer end of said stuffing box adapted to engage and move said packing units axially towards the pressure end of said stuffing box, and each of said units having means on their respective casings to bypass leakage fluid when the differential fluid pressure across the unit has exceeded a predetermined pressure setting.

5. A packing assembly to be mounted in the stuffing box about a rotary element subject to high pressure leakage fluid including a plurality of packing units mounted in said stuffing box about the rotary element and disposed to coact with each other; each of said units comprising, an enclosing casing recessed to form an annular packing receiving space having an annular shoulder at the pressure end of said annular packing receiving space, compressible packing rings in said annular packing receiving space, at least one of said units having means at the end remote from the pressure end for maintaining said compressible rings in said packing receiving space, resilient means in said annular packing receiving space adjacent the shoulder end of said casing to coact with said shoulder for compressing said compressible packing rings, bypass passage means extending through said casing parallel to the axial line of said shaft, inlet means for said passage means to receive leakage fluid under pressure, regulating means in said passage, means regulating the pressure at which said regulating means will open, and said passage means having its outlet end disposed to pass the leakage fluid at the pressure setting of said regulating means to the next adjacent package unit.

6. A packing assembly to be mounted in the stuffing box about a rotary element subject to high pressure leakage fluid including a plurality of packing units mounted in said stuffing box about the rotary element and disposed to coact with each other; each of said units comprising, an enclosing casing recessed to form an annular packing receiving space having an annular shoulder at the pressure end of said annular packing receiving space, compressible packing rings in said annular packing receiving space, at least one of said units having the end of its packing receiving space remote from the annular shoulder opening, and means on the unit adjacent to the open ended packing receiving space to engage and compress the packing in said open ended packing receiving space on axial movement of said adjacent unit relative to said rotary element, an adjustable gland connected to the outer end of said stuffing box adjustable to engage and move said packing units axially towards the pressure end of said stuffing box, at least one of said units having means at the end remote from the pressure end for maintaining said compressible rings in said packing receiving space, each of said packing units having means on their respective casings to bypass leakage fluid when the differential fluid pressure across said unit exceeds a predetermined limit.

7. In a packing assembly as claimed in claim 6 wherein said last mentioned means includes bypass passage means extending through each of said casings parallel to the axial line of said shaft, inlet means for said passage means to receive leakage fluid under pressure, regulating means in said passage, means regulating the pressure at which said regulating means will open, and said passage means having its outlet end disposed to pass the leakage fluid at the pressure setting of said regulating means to the next adjacent packing unit.

8. In a packing assembly as claimed in claim 6 wherein the last mentioned means includes bypass passage means extending through each of said casings parallel to the axial line of said shaft, a check valve of the ball type in said passage means and a resilient element in engagement with said ball, and threaded means in each of said casings for adjusting said resilient element to provide the predetermined limit for said unit.

9. In a packing assembly as claimed in claim 5 wherein the regulating means in said bypass passage means includes a check valve of the ball type and a resilient element in engagement with said ball, and threaded means for adjusting said resilient element to the desired tension for the pressure setting for said unit.

References Cited in the file of this patent

UNITED STATES PATENTS

| | | |
|---|---|---|
| 470,304 | Martin et al. | Mar. 8, 1892 |
| 1,776,797 | Sheldon | Sept. 30, 1930 |
| 1,996,780 | Wheeler | Apr. 9, 1935 |
| 2,009,423 | Wheeler | July 30, 1935 |
| 2,175,868 | Bentley | Oct. 10, 1939 |
| 2,348,004 | Gruetjen | May 2, 1944 |